May 13, 1941.      H. WAGNER      2,241,972
STRUCTURE OF AIRCRAFT SURFACES

Filed Feb. 4, 1938

Inventor
Herbert Wagner
by
Michaelis & Michaelis, Attys.

Patented May 13, 1941

2,241,972

UNITED STATES PATENT OFFICE 2,241,972

STRUCTURE OF AIRCRAFT SURFACES

Herbert Wagner, Dessau, Germany, assignor to Junkers Flugzeug-und-Motorenwerke Aktiengesellschaft, Dessau, Germany Application February 4, 1938, Serial No. 188,727
In Germany February 8, 1937

3 Claims. (Cl. 244—123)

My invention relates to aircraft and more particularly to the wings or bearing planes of flying machines, to the rudders, ailerons and other controlling, steering or stabilising surfaces used in connection with aircraft in general and with flying machines in particular. It is mainly concerned with the structural members forming the backbone of such surfaces with a view to rendering these surfaces strong and highly resistive against mechanical stresses, while at the same time offering ready access to the interior of the hollow structures constituting the wing, rudder or similar part of aircraft.

In wings or bearing planes as hitherto constructed the main spar or supporting member has already been designed as a box girder. Hitherto the walls of such box girders were rigidly connected with each other, however since these girders are comparatively low structures acted upon by high bending forces, a large number of rivets, screw bolts, angles and the like were required for this connection and in addition the interior of these box girders, more especially such forming part of smaller aircraft, was accessible only with difficulty or altogether inaccessible, rendering it impossible to accommodate within the girder useful or other loads and to inspect the interior of the girder.

It has also been suggested to form the wings of airplanes with box girders traversed by partitions or cross beams, the longitudinal walls and the transverse walls being separate structural parts. This design offers the advantage of facilitating the production of the supporting member, since the longitudinal walls of the box girders and the transverse walls fixed to them can be made separately. In these supporting members the longitudinal walls and the transverse walls are disengageably connected with each other so that the interior of the girder can be rendered accessible for repair by removing a longitudinal wall and the parts of transverse walls attached to it.

It is an object of my invention to provide a hollow structure for bearing planes and other surfaces, the interior of which offers a large room for accommodation and is easily accessible. I attain this according to this invention, by composing this structure of a plurality of longitudinal wall-forming girders, disengageably connected with each other, each of which constitutes a body resistive to buckling and bending, the thickness of which is small as compared to its length and which does not present abrupt differences of dimension in the longitudinal direction. These longitudinal walls are connected with each other throughout their length in a manner such as to be able to resist great shearing forces. They form a statically immovable hollow body, the walls of which are connected in the longitudinal direction by hinges. In a structure which is designed in this manner, the transverse walls hitherto used, which serves to take up the thrust, can either be dispensed with altogether or need be provided only at points of attack of great forces, for instance in those places where engines are fixed to the structure, so that almost the whole of the interior of the structure is available for he accommodation of loads. Manufacture of such a structure is also facilitated since the box walls, being hinged together, can be manufactured separately, and if such a wall is damaged, only this wall need be replaced. I prefer so designing the longitudinal connections of the walls that no complicated or difficultly separable connections, such as rivet connections, must be loosened for the purpose of replacing a wall.

In a particularly advantageous form of my invention the top and bottom walls of the bearing plane are formed as members resisting buckling and bending stresses over a considerable portion of the depth of the plane, these walls constituting two of the walls of the box girder, so that the main part of the wing proper constitutes the box girder and separate supporting members mounted in the wing can be dispensed with. This form of my invention also renders it possible to render the interior of the girder accessible from without by simply loosening the top or bottom part of the skin of the wing which constitutes the respective wall of the girder, and I am then enabled to readily introduce fuel tanks and other loads into the girder. In view of the fact that all transverse walls or braces are dispensed with in the interior of the girder the tanks or other bodies to be accommodated in the wing can also be introduced in the direction of the longitudinal wing axis. The interior of the girder will afford a particularly large space for accommodation if the width of that part of the top and bottom skin of the wing, which also forms the top and bottom walls of the box girder, amounts to at least 50% of the depth of the wing. The hinge connections of adjoining girder walls may also be so arranged as to be particularly adapted to the special conditions prevailing in each individual case. If the girder is formed with four walls, at least one of the walls will be rigidly connected with an adjoining wall. I may however also rigidly connect, in a four wall girder, two opposed walls with one of the other walls or with parts thereof. In the latter case, when assembling the girder, these parts will form the two other walls of the box. The lines, along which these partial walls are hinged to each other, preferably extend in the plane which is free from stresses when the girder is subjected to bending stresses. The top wall of the box girder may be connected with the two side walls in a manner such as to render the connection resistive against bending stresses and the bottom wall may be hinged at its longitudinal edges to the two lateral walls.

In the drawing affixed to this specification and forming part thereof several embodiments of my invention are illustrated diagrammatically by way of example.

In the drawing—

Figure 1:
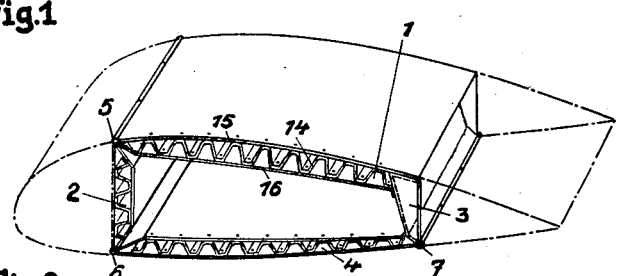
Figs. 1 to 4 are sectional diagrams of such girders, the walls of which are connected with each other in different manners.

Referring to the drawing and first to Fig. 1, 1, 2, 3 and 4 are the walls of the box-shaped girder which takes up the forces acting on the wing. Each wall is designed so as to be resistive to crushing and bending stresses. In the embodiments shown in Figs. 1 to 4, each wall 1 and 4 is formed of two plain metal plates 15 and 16 interconnected by a corrugated metal sheet 14. The corrugated sheet is inserted between the two plain plates 15 and 16 and connected with them by suitable means, such as screw bolts or rivets or by welding.

Figure 5:
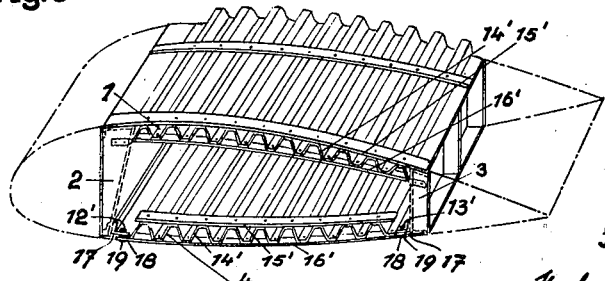
Fig. 5 illustrates the form of the girder shown diagrammatically in Fig. 4, if viewed from the side, on which the wing is fixed to the fuselage.

In the modification illustrated in Fig. 5, the walls 1 and 4 of the box are constituted by corrugated sheets 14', on both sides of which are secured, instead of the plain sheets, ledge-shaped members 15' and 16' spaced from each other and rigidly connected with the corrugated sheets 14', these latter being highly resistive against tensional and pressure stresses.

In all modifications shown in the drawing the top walls 1 and bottom walls 4 of the box girder also form part of the top and bottom skin of the bearing plane illustrated in the drawing, the width of the top and bottom walls of the girder amounting at least to 50% of the depth of the plane, so that the space enclosed between the walls is very large.

In the embodiment shown in Fig. 1 the connection between the top wall 1 and the adjoining side wall 3 of U-section is resistive against bending stresses. The side wall 2, which here also consists of corrugated sheet metal 14 fixed between plain sheets 15 and 16, and the bottom wall 4 are separate parts which are hingedly connected with each other and with the walls 1 and 3 at 5, 6 and 7.

Figure 2:
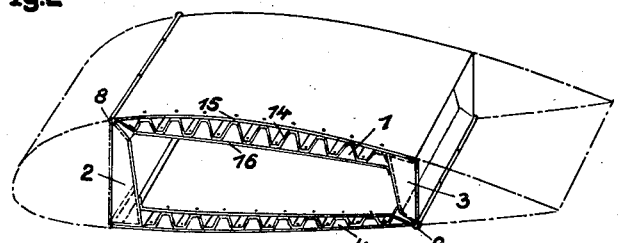

In the modification illustrated in Fig. 2 the connections between the top wall 1 and the side wall 3 of U-section, on the one hand, and between the bottom wall 4 and the other side wall 2, also of U-section, on the other hand, are resistive against bending stresses. The walls 1 and 2 are connected with the walls 3 and 4 at the edges 8 and 9 by means of hinges.

Figure 3:
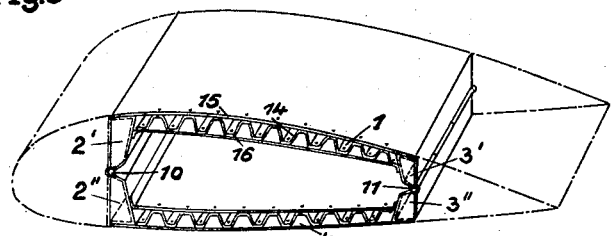

In the embodiment of Fig. 3 the connections between the top and bottom walls 1 and 4 and the parts 2', 3' and 2", 3" of the front and rear side walls, respectively, are resistive against bending stresses, while the hinge connections between the walls 2', 2", 3', 3" at 10 and 11, respectively, lie in planes which are free from stresses when the girder is acted upon by bending stresses.

Figure 4:
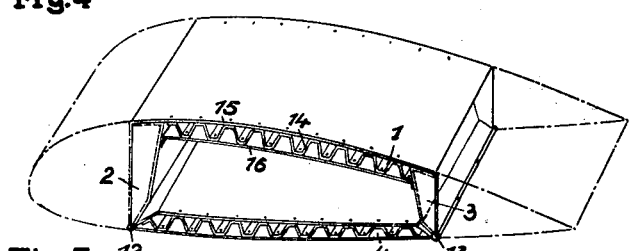

In the embodiments illustrated in Figs. 4 and 5 the connections between the top wall 1 and the side walls 2 and 3 of U-section are resistive against bending stresses. The side walls are connected with the bottom wall 4 at 12 and 13 by hinges.

In the embodiment of Fig. 5 the bottom wall 4 is linked at 12' and 13' to the side walls 2 and 3, the parts to be connected forming thin superposed flanges 17 and 18, which are held together by suitable means such as screw bolts 19. If it is desired to render the interior of the box girder accessible, merely the screw bolts 19 need be loosened whereupon the bottom wall 4 can be removed.

The box-shaped girder structure which constitutes the backbone of the wing or the like forms a statically immovable hollow body with longitudinally extending hinge connections. Since no transverse walls or the like are provided in the interior of the girder and since the walls of the girder are low as compared to their length and do not present any abrupt changes of height in the longitudinal direction, a large space is available in the box girder for the accommodation of loads and other objects.

I wish it to be understood that I do not desire to be limited to the exact details of construction shown and described for obvious modifications will occur to a person skilled in the art.

I claim:

1. An aircraft wing structure comprising a hollow main box girder, said girder constituting at least one-half the wing section and extending longitudinally along a substantial portion of the wing span, said main girder comprising a plurality of integral rigid continuous wall sections each of which is in itself a small girder and constitutes more than one wall of the main box girder, and means connecting adjacent edges of the sections to each other.

2. An aircraft wing structure comprising a hollow main box girder constituting at least one-half the wing section and extending longitudinally along a substantial portion of the wing span, said main girder comprising a plurality of integral rigid continuous wall sections, each of which constitutes more than one wall of the main box girder, the upper and lower surfaces of two of the sections constituting the upper and lower skin covering of the wing, and means connecting adjacent edges of the sections to each other.

3. An aircraft wing structure comprising a hollow main box girder, said girder constituting at least one-half the wing section and extending longitudinally along a substantial portion of the wing span and comprising a plurality of integral rigid continuous wall sections each of which is in itself a small girder and constitutes more than one wall of the main box girder, at least one of said sections being hingedly connected along its edges to the edges of the next adjacent section, the upper and lower surfaces of the two sections constituting the skin covering of the wing.

HERBERT WAGNER.